F. L. DU BOSQUE

FERRY BRIDGE.

APPLICATION FILED NOV. 2, 1913.

Reissued June 5, 1917.

14,313.

2 SHEETS—SHEET 1.

INVENTOR.

Francis L. Du Bosque

BY

E. M. Marshall

ATTORNEY

F. L. DU BOSQUE.
FERRY BRIDGE.
APPLICATION FILED NOV. 2, 1915.
Reissued June 5, 1917.
14,313.
2 SHEETS—SHEET 2.
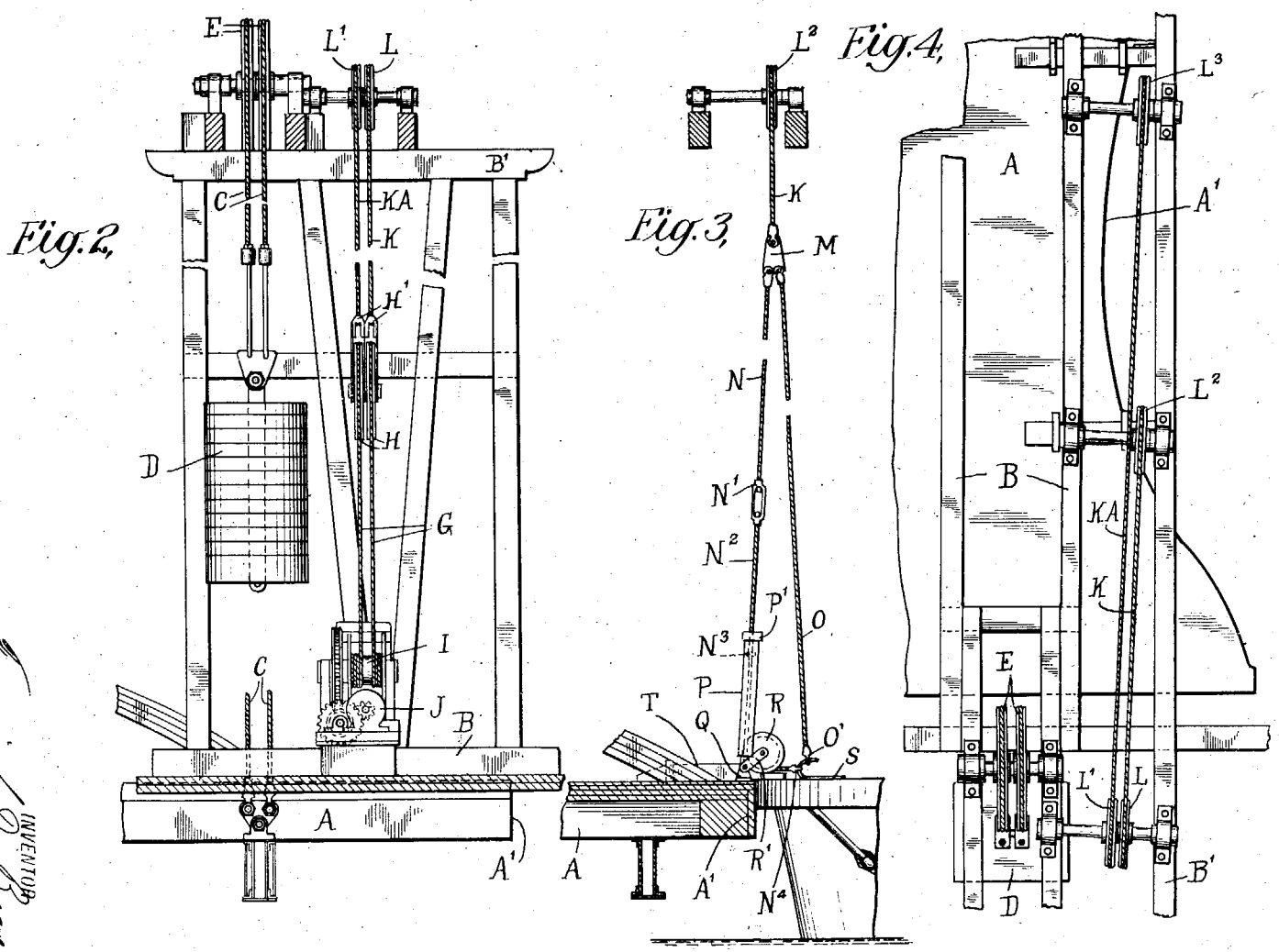
INVENTOR
Francis L. Du Bosque
BY
E. W. Marshall
ATTORNEY

UNITED STATES PATENT OFFICE.

FRANCIS L. DU BOSQUE, OF GREAT NECK, NEW YORK, ASSIGNOR TO THE J. EDWARD OGDEN COMPANY, OF NEW YORK, N. Y., A CORPORATION OF NEW JERSEY.

FERRY-BRIDGE.

14,313. Specification of Reissued Letters Patent. Reissued June 5, 1917.

Original No. 1,118,113, dated November 24, 1914, Serial No. 808,693, filed December 26, 1913. Application for reissue filed November 2, 1915. Serial No. 59,265.

*To all whom it may concern:*

Be it known that I, FRANCIS L. DU BOSQUE, a citizen of the United States of America, residing in Great Neck, in the county of Nassau, in the State of New York, have invented certain new and useful Improvements in Ferry-Bridges, of which the following is a true and exact description, reference being had to the accompanying drawings, which form a part thereof.

My present invention consists in novel means for supporting and for mooring a ferryboat to the movable end of the bridge or hinged platform from which the passengers and freight pass onto and off the boat.

The object of my invention is to provide simple and effective means for the purpose specified, which will make unnecessary the pontoon or float usually employed to carry the weight of the free end of the bridge, and which will enable the movable end of the bridge to be readily brought to, and to be maintained at the proper level relative to the ferryboat, notwithstanding the rising and falling movements which the latter may have, and which will insure a proper mooring of the boat to the bridge.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated and described one form in which my invention may be embodied.

Of the drawings:

Fig. 2 is a side elevation of a portion of the apparatus shown in Fig. 1.

Fig. 3 is a partial sectional elevation taken on the line 3—3 of Fig. 1, and

Fig. 4 is a plan view of a portion of the apparatus shown in Fig. 1.

Figure 1:
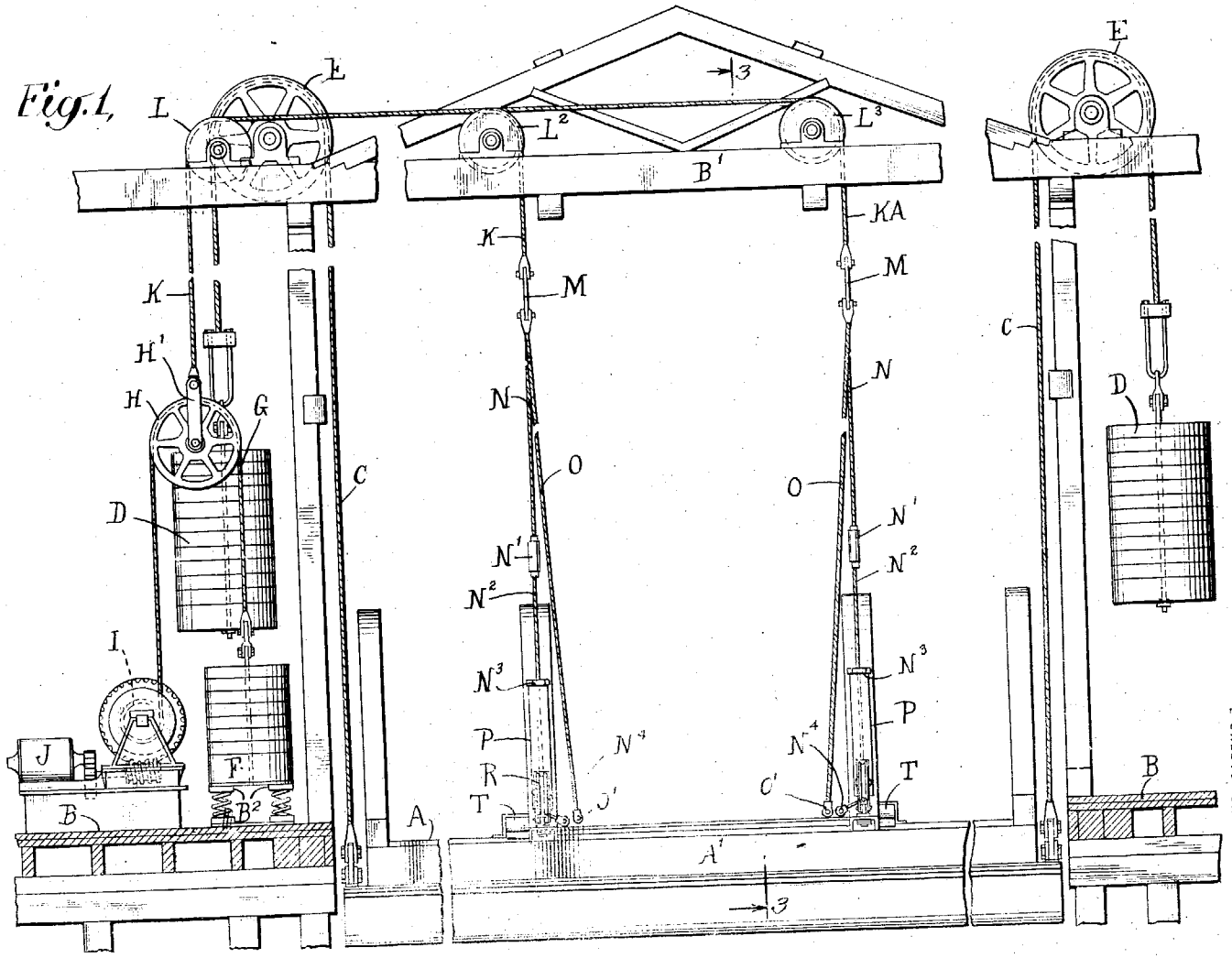
Figure 1 is an elevation of the ferry bridge, viewed from the river side.

In the drawings, A represents the ferry bridge proper, and $A^1$ the end surface at the movable or rising and falling end thereof against which the ferryboats are moored. At its shore end (not shown in the drawings) the bridge A may be hinged in the usual manner.

B represents the stationary or shore platform at the sides of the bridge, and $B^1$ a scaffold or superstructure rising from the platforms B and extending over the bridge. The superstructure $B^1$ may be the supporting frame for the roof of a building inclosing the ferry bridge except at the water side. As shown, the weight of the movable end of the bridge is counterbalanced in part by weights D, connected to the free end of the bridge by cables C, passing over pulleys E journaled on the scaffold or frame $B^1$, and exerting a constant lifting force on the free end of the bridge. There is also connected to the free end of the bridge an adjustable counter-balancing mechanism, the counter weight F of which is connected by two cables G to a winding drum I operated by the motor J. Each of the cables G runs over a corresponding pulley H. The yokes $H^1$ of these pulleys are connected one to a cable K and the other to a cable KA. These cables run over pulleys L and $L^1$, respectively, arranged side by side on the scaffold $B^1$. The cable K runs over the pulley L to a pulley $L^2$ also mounted on the scaffold $B^1$, and extends downward from the pulley $L^2$ at one side of the central or vehicle passageway of the bridge. The end of the cable K extending down from the pulley $L^2$ is connected by the link M to two cables N and O. The latter may be regarded as forming bifurcations or branched extensions of the cable K. The cable N comprises an upper section and a lower section $N^2$, the two sections being connected by the turnbuckle $N^1$. The section $N^2$ carries a collar $N^3$ which is slidably mounted in a sleeve P, hinge connected at its lower end to a member Q, which is secured to the bridge. The collar $N^3$ is adapted to engage an internal shoulder $P^1$ formed at the upper end of the member P, and thereby limit the upward movement of the cable section $N^2$ relative to the sleeve P under certain conditions, as hereinafter explained. The cable section $N^2$ also runs under a pulley R, connected by the link $R^1$ to the block Q, and at its lower end is provided with an eye $N^4$ adapted to be caught over a hook S attached to the boat. The cable O terminates at its lower end in an eye $O^1$ adapted to be caught over the hook S.

The cable KA extends from the pulley $L^1$ beyond the pulley $L^2$ and depends from the pulley $L^3$ at the opposite side of the central passageway of the ferry bridge from that at which the pulley $L^2$ is located. The depending end of the cable KA is connected by a link M to cables N and O, which are identical in construction and arrangement with the corresponding parts attached to the cable K, and in particular comprise eyes $N^4$ and $O^1$ adapted to take over a correspondingly located hook S secured to the deck of the boat to be moored against the ferry bridge.

To prevent the movable end of the bridge A from falling below the level of the deck of the boat moored thereto, I provide the bridge with toggle bars T, which are rigidly secured to the ferry bridge, project beyond the surface $A^1$, and bear upon the deck of a boat moored against the bridge.

The counterweight F is made heavy enough so that when suspended through the cables G from the pulleys H, the sum of the lifting effects of the weights D and F is substantially more than is required to counterbalance the movable end of the ferry bridge A when the latter is unloaded, but may advantageously be somewhat less than is required to counterbalance the movable end of the bridge when the maximum live load is passing over the latter.

In the condition of the apparatus preparatory to mooring a boat against the end $A^1$ of the bridge A, the movable end of the bridge will be held at such a height that the toggle bars T will be above the level of the deck of the approaching boat. The bridge will then have no load on it, eyes $O^1$ and $N^4$ will be unhooked and the counterweight F will rest on the supports $B^2$. The tension on the cables G, while then insufficient to lift the weight F off the supports $B^2$, furnishes the upward pull through the cables K and KA, the cables N, the collars $N^3$ and sleeve P, necessary in addition to the upward pull of the cable C to support the movable end of the bridge. After the approaching boat has moved into position against the end $A^1$ of the bridge A, the motor J is operated to turn the winding drum in the unwinding direction, thus permitting the pulleys H to rise and the movable end of the bridge to descend. This unwinding movement of the drum I is continued until the bars T engage the deck of the boat and thereafter until the cables N and the cables O are slackened sufficiently to permit the eyes $N^4$ and $O^1$ to be caught over the hooks S. The motor J is then reversed, and the winding drum turned in the winding direction to lift he counter weight F high enough above the supports $B^2$ to prevent it from contacting with the latter on the rising and falling movements of the bridge and the end of the boat moored thereto, which may occur during the subsequent boat, unloading and loading operations, by tidal or wave effects, and the changes in the live load on the ferry bridge and in the weight of the boat occurring as the latter is unloaded and loaded. In the then existing condition of the apparatus the collars $N^3$ of the cable sections $N^2$ are out of engagement with the shoulders $P^1$ of the sleeves P, and whatever force is transmitted through the cable N is available to hold the boat against the end surface $A^1$ of the bridge through the lower horizontal portions of the cable sections $N^2$. While normally the pull of the weight F transmitted through each of the cables K and KA is divided between the corresponding branch cables N and O, the entire pull of each of the cables K and KA is available to resist a horizontal movement of the boat away from the end $A^1$ of the bridge, for on a slight initial movement of separation the lifting portion of the cable branches N will be shortened, taking the weight from the other branches O which will slacken and the entire pull of each of the cables K and KA will then be transmitted through the corresponding cable N.

The cable sections O, by taking part of the pull of the cables K and KA under normal conditions, prevent the free end of the bridge from lifting when the bridge carries no live load or only a small fraction of its maximum live load, and the counterbalancing weights exert a greater lifting force than is required to support the weight of the free end of the bridge. The turnbuckles $N^1$ provide ready means for obtaining the rather nice adjustment in length of the cables N relative to the cables O.

While I prefer to employ counterbalancing provisions such as are formed by the weights D and their connections to the free end of the bridge, exerting a constant lifting force on the free end of the bridge, but little less than that required to support the free end of the bridge, these weights D may be reduced in magnitude or entirely dispensed with, without other change in the apparatus except an increase in the magnitude of the weight F. It is desirable, however, to keep the magnitude of the weight F small, inasmuch as the size and weight of the winding apparatus and the power required for operating the winding drum I depend upon the magnitude of this weight. The weight F must be large enough, however, to exert the force, through the cable sections $N^2$, needed to hold the boat against the free end of the bridge.

With the arrangement described the boat may be quickly moored to or released from its connection with the ferry bridge, and the end of the ferry bridge is at all times maintained at the proper level with respect to the boat moored against it. On this account it is unnecessary to provide the short gangplanks bridging the joint between the ferry bridge and a boat moored against it, which have heretofore been frequently employed, both in the passageways for passengers and the passageway for vehicles, in the case of large size ferry boats. These supplemental gangplanks add materially to the time required and the labor involved in mooring a boat against the ferry bridge proper, and in disconnecting the boat and bridge, and the gang planks thus used in the vehicle passageways are liable to slide or tilt out of position with consequent damage to vehicles passing onto and off the boat. In releasing a boat from the bridges, the motor J is operated to unwind the cables G from the drum I until the cable branches N and O are sufficiently slack to permit the release of the eyes $O^1$ and $N^4$ from the hooks S after which the motor is reversed to raise the toggles off the boat.

It is obviously not essential that each of the cables KA be terminated in two branches such as N and O. For example, each cable may be terminated in a single cable section corresponding to either the branch N or the branch O.

The action of the branches N when used alone (as already described under special conditions with the branches O slack) is clearly such as to hold the boat against the bridge, but without undue strains because of the floating condition of the weight F.

If the branches O were used alone they would tend to lift not only the boat to which they are connected but also the bridge since the bars T extend onto the boat. The boat and bridge would then ride up and down together as the boat is influenced by waves and tides and shifting loads, but no undue strains can come upon the cables connected with the counterweight F because of the fact that this weight will be lifted whenever the boat is depressed by a heavy load or by a falling tide.

Furthermore, the supports $B^2$ are compression springs and these materially aid the motor J when it is started to first lift the weight F.

While in accordance with the provisions of the statutes, I have illustrated and described the best form of my invention now known to me, it will be apparent to those skilled in the art that changes may be made in the form of the apparatus disclosed without departing from the spirit of my invention as claimed herein and that under some conditions certain features of my invention may be used without a corresponding use of other features.

Having now described my invention, what I claim as new and desire to secure by Letters Patent, is—

1. The combination with a hinged ferry bridge, of means for mooring a ferryboat thereto and for equalizing the height of the bridge and boat, comprising a lifting element having one branch connected both to said bridge and to said boat to exert a horizontal force on the boat tending to hold the latter against the bridge and a lifting force on the bridge, and a second branch connected directly to the boat and adapted to exert a lifting force on the latter.

2. The combination with a hinged ferry bridge, of means for mooring a ferryboat thereto and for manipulating the bridge, comprising a pulley secured to the free end of the bridge, a stationary superstructure, a pulley mounted thereon, a counter-balancing weight, and a flexible element running over the last mentioned pulley and having one end connected to said counter weight and the other end depending from said overhead structure and bifurcated, with one branch of said bifurcated end passing under the first mentioned pulley and secured to the boat and the other branch attached directly to the boat.

3. The combination with a hinged ferry bridge, of means for mooring a ferryboat thereto and for manipulating the bridge, comprising a stationary superstructure, a pulley mounted thereon, a flexible element running over said pulley, a counter-weight, means adjustably connecting one end of said flexible element to said counter-weight, the other end of said flexible element being bifurcated, and means for operatively connecting the one branch of said bifurcated end both to said bridge and to a boat moored thereto and the second branch of said bifurcated end to said boat only, so that the first mentioned branch may exert a horizontal force on the boat tending to hold the latter against the bridge and exert a lifting force on the bridge, and said second branch of said bifurcated end may exert a lifting force on the latter when the boat is held against the bridge.

4. The combination with a hinged ferry bridge, of means for mooring a ferry boat thereto and for manipulating the bridge, comprising a stationary superstructure, a pulley mounted thereon, a flexible element running over said pulley, a counter-weight, means adjustably connecting one end of said flexible element to said counter-weight, the other end of said flexible element being bifurcated, means for operatively connecting one branch of said bifurcated end both to said bridge and to a boat moored thereto and the second branch of said bifurcated end to said boat only, so that the first mentioned branch may exert a horizontal force on the boat tending to hold the latter against the bridge and exert a lifting force on the bridge and said second branch may exert a lifting force on the boat when the latter is held against the bridge, a resilient support for said counter-weight, and means for adjusting the connection between said counter-weight and said flexible element whereby said counter-weight may be moved off said support and have all of its weight supported through said flexible element, or may be permitted to remain on said support and have a portion only of its weight supported by said flexible element.

5. The combination with a hinged ferry bridge device of means for mooring a ferry boat thereto and for equalizing the height of the bridge and boat, comprising a power applying mechanism including a bifurcated lifting element, means for connecting one branch of said bifurcated element both to said bridge and to said boat and the other branch to the boat only, so that the first mentioned branch may simultaneously exert a horizontal force on the boat tending to hold the latter against the bridge and a lifting force on the bridge, while the other branch may exert a lifting force only on the boat, and means for connecting the first mentioned branch of said bifurcated element to said bridge to exert a lifting force on the latter when neither branch of said bifurcated element is connected to said boat.

6. The combination with a hinged ferry bridge of means for mooring a ferryboat thereto and for manipulating the bridge, comprising parts secured to said bridge and bearing on a boat moored thereto and thereby preventing said bridge from moving to too low a level relative to said boat, a stationary superstructure, a pulley mounted thereon, a flexible element running over said pulley, a counter-weight, means adjustably connecting one end of said flexible element to said counter-weight, the other end of said flexible element being bifurcated, means for connecting one branch of said bifurcated end both to said bridge and to a boat moored thereto and for connecting the other branch to the boat only, so that the first mentioned branch may simultaneously exert a horizontal force on the boat tending to hold the latter against the bridge, and a lifting force on the bridge while the other branch may exert a lifting force on the boat and means for connecting the first mentioned branch to the bridge to exert a lifting force on the latter, and when neither branch of said bifurcated element is connected to the boat.

7. The combination with a hinged ferry bridge, of means for mooring a ferryboat thereto comprising a lifting element connected to said bridge and to said boat to exert a horizontal force on the boat tending to hold the latter against the bridge and a lifting force on the bridge.

8. The combination with a hinged ferry bridge, of means for mooring a ferryboat thereto and for manipulating the bridge, comprising a pulley on the bridge, a stationary superstructure, a pulley mounted thereon, a counterweight, and a flexible element running over said superstructure pulley and having one end connected to said counterweight and the other end depending from said overhead structure under the bridge pulley and connected to said boat to exert a horizontal force on the boat tending to hold the latter against the bridge and a lifting force on the bridge.

9. The combination with a hinged ferry bridge, of means for connecting a ferryboat therewith and for manipulating the bridge, comprising a stationary superstructure, a pulley mounted thereon, a counterweight, and a flexible element running over said pulley and having one end connected to said counterweight and the other end depending from said overhead structure and connected to the boat to exert a lifting force thereon.

10. The combination with a hinged ferry bridge, of means for connecting a ferryboat therewith and for manipulating the bridge, comprising a stationary superstructure, a pulley mounted thereon, a counter weight, and a flexible element running over said pulley and having one end connected to said counter weight and the other end depending from said overhead structure and connected to the boat to exert a lifting force thereon, said bridge being provided with overhanging projections whereby it is lifted with the boat, when the boat is lifted by said flexible element.

11. The combination with a hinged ferry bridge, of means for mooring a ferryboat thereto and for manipulating the bridge comprising a pulley secured to the bridge near its free end, and a lifting cable depending from an overhead support, extending under the pulley and adapted to be secured to a boat, whereby said cable exerts a lifting force on the bridge and tends to hold the boat against the bridge.

12. The combination with a hinged ferry bridge and a counter weight for supporting a portion of the weight of the bridge, of means for mooring a ferryboat thereto and for manipulating the bridge comprising a pulley secured to the bridge near its free end, and a lifting cable depending from an overhead support, extending under the pulley and adapted to be secured to a boat, whereby said cable exerts a lifting force on the bridge and tends to hold the boat against the bridge.

13. The combination with a hinged ferry bridge and means for supporting a portion of the weight of the bridge, of means for mooring a ferryboat thereto comprising a lifting element connected to said bridge and to said boat to exert a horizontal force on the boat tending to hold the latter against the bridge and a lifting force on the bridge.

14. The combination with a hinged ferry bridge of means for mooring a ferryboat thereto and for manipulating the bridge, comprising parts secured to said bridge and bearing on a boat moored thereto and thereby preventing said bridge from moving to too low a level relative to said boat, a stationary superstructure, a pulley mounted thereon, a flexible element running over said pulley, a counter-weight, means adjustably connecting one end of said flexible element to said counter-weight, means for connecting the flexible element both to said bridge and to a boat moored thereto so that the connection may simultaneously exert a horizontal force on both the bridge and boat tending to hold the latter against the bridge, and a lifting force on the boat.

15. The combination with a ferry bridge, of means for mooring a ferry boat thereto comprising a pulley in a vertical plane on said bridge, a cable passing around a portion of said pulley, and a counterweight, one end of said cable being connected with the counter-weight and means for connecting the other end of said cable with a ferry boat, whereby the ferry boat is yieldingly drawn toward said bridge.

16. The combination with a ferry bridge, of means for mooring a ferry boat thereto comprising a pulley on said bridge, a cable passing around a portion of said pulley, and a counter-weight, one end of said cable being connected with the counterweight, means for connecting the other end of said cable with a ferry boat, whereby the ferry boat is yieldingly drawn toward said bridge, and means for controlling said counterweight when it is desired to disconnect said cable from the ferry boat.

17. The combination with a hinged ferry bridge, of means for mooring a ferry boat thereto and for manipulating the bridge, comprising a stationary superstructure, a pulley mounted thereon, a flexible element running over said pulley, a counter-weight, means adjustably connecting one end of said flexible element to said counter-weight, the other end of said flexible element being bifurcated, means for operatively connecting one branch of said bifurcated end both to said bridge and to a boat moored thereto and the second branch of said bifurcated end to said boat only, so that the first mentioned branch may exert a horizontal force on the boat tending to hold the latter against the bridge and exert a lifting force on the bridge and said second branch may exert a lifting force on the boat when the latter is held against the bridge, a support for said counter-weight, and means for adjusting the connection between said counterweight and said flexible element whereby said counterweight may be moved off said support and have all of its weight supported through said flexible element, or may be permitted to remain on said support and have a portion only of its weight supported by said flexible element.

In testimony whereof I have hereunto set my hand this 29th day of September, 1915.

FRANCIS L. DU BOSQUE.